United States Patent [19]

Schmidt et al.

[11] 4,346,203

[45] Aug. 24, 1982

[54] EMULSIFIER FOR THE PREPARATION OF POLYMERS

[75] Inventors: Adolf Schmidt, Cologne; Helmut Meier; Günther Schedrat, both of Leverkusen; August Bockmann, Krefeld, all of Fed. Rep. of Germany

[73] Assignee: Bayer Aktiengesellschaft, Leverkusen, Fed. Rep. of Germany

[21] Appl. No.: 173,567

[22] Filed: Jul. 30, 1980

[30] Foreign Application Priority Data

Aug. 4, 1979 [DE] Fed. Rep. of Germany ....... 2931674
Apr. 2, 1980 [DE] Fed. Rep. of Germany ....... 3012822

[51] Int. Cl.$^3$ ............................................. C08F 2/26
[52] U.S. Cl. .................................... 526/225; 524/166; 524/745
[58] Field of Search ................ 260/29.6 R, 29.6 XA, 260/29.6 T, 29.6 TA, 29.6 H, 29.6 SQ, 29.7 R, 29.7 H, 29.7 T, 29.7 SQ, DIG. 16, DIG. 21, 29.6 Z, 29.6 MQ; 525/3; 526/225, 911, 344.2

[56] References Cited

U.S. PATENT DOCUMENTS

| | | | |
|---|---|---|---|
| 2,829,134 | 4/1958 | De Coene | 526/344.2 |
| 3,037,007 | 5/1962 | Scholz et al. | 526/344.2 |
| 3,190,763 | 6/1965 | Schleede et al. | 260/DIG. 16 |
| 3,856,738 | 12/1974 | Bodesheim et al. | 260/DIG. 21 |
| 3,937,725 | 2/1976 | Pfeifer | 260/DIG. 21 |
| 4,218,553 | 8/1980 | Winter et al. | 526/225 |

FOREIGN PATENT DOCUMENTS 2429326 2/1975 Fed. Rep. of Germany ... 526/344.2

Primary Examiner—Paul R. Michl
Attorney, Agent, or Firm—Sprung, Horn, Kramer & Woods

[57] ABSTRACT

An emulsifier for the preparation of polymers comprising more than 50 percent by weight of an alkali metal salt of polysulphonic acid of alkane of medium chain length is disclosed. The emulsifier is useful in forming emulsions of polymers especially thermoplastic polymers and in particular polymers of vinyl chloride. It is useful in vinyl chloride polymerization and co-polymerization to form an emulsifier composition having improved transparent and antistatic properties. The polymer can be added before, during or after polymerization. When added after polymerization it provides improved properties to a calendered object obtained from the polymer.

9 Claims, No Drawings

EMULSIFIER FOR THE PREPARATION OF POLYMERS

CROSS REFERENCE TO RELATED APPLICATIONS

This application is related to application Ser. No. 173,568, filed July 30, 1980.

The invention relates to an emulsifier, for the preparation of polymers, which is based on alkali metal alkanesulphonates and to its use.

It is generally known to employ alkali metal alkanesulphonates with a high content of monosulphonate, by themselves or in combination with other emulsifiers, in the emulsion polymerisation of vinyl chloride and vinyl chloride copolymers (DE-OS (German Published Specification) 2,429,326).

It is known, from DE-OS (German Published Specification) 2,429,326, to use alkali metal alkanesulphonates together with an alkali metal arylsulphonate, as an emulsifier in the polymerisation of monomeric vinyl chloride. The alkane radicals in the alkali metal alkanesulphonates have a chain length of 10 to 18 carbon atoms.

The use of the sodium salt of an isomer mixture of alkyl-disulphonic acid diaryl esters containing sulphone groups as an emulsifier in the preparation of polyvinyl chloride is described in DT-OS (German Published Specification) 2,633,833.

It is known (Houben-Weyl, Volume XIV, page 197) that only alkanesulphonates with a high content of monosulphonate are suitable as polymerization emulsifiers, whilst those with relatively high disulphonate and polysulphonate contents are said to be ineffective.

The known emulsifiers give rise to insufficient transparency, an unsatisfactory degree of yellowness in the polyvinyl chloride and/or an unsatisfactory antistatic finish.

An emulsifier for the preparation of polymers has been found, which is based on alkali metal alkanesulphonates and contains more than 50% by weight of an alkali metal salt of a polysulphonic acid of an alkane of medium chain length.

An emulsifier in the context of the present invention is a substance which is capable of converting the polymer into a finely divided form.

In the emulsifiers according to the invention, polysulphonic acids of an alkane of medium chain length contain two or more sulphonic acid groups. Mixtures of varying degree of sulphonation, essentially with two and three sulphonic acid groups, are preferably employed. The degree of sulphonation is in general in the range from 2 to 4, preferably from 2 to 3.

In contrast, monosulphonic acids of an alkane of medium chain length contain only one sulphonic acid group.

Alkanes of medium chain length are saturated, straight-chain or branched hydrocarbons, preferably straight-chain hydrocarbons, with about 8 to 20 carbon atoms. Polysulphonic acids of alkanes with an average carbon number of 13 to 17 carbon atoms can preferably be used.

Sulphonic acids of alkanes of different chain lengths are in general employed.

Alkali metal salts which may be mentioned are essentially the sodium and potassium salts.

The preparation of the alkali metal salts of the alkanesulphonic acids is in itself known.

For example, the salts can be prepared by sulphochlorination of the alkanes and subsequent saponification of the product with an alkali metal hydroxide (Chemie und Technologie der Paraffin-Kohlenwasserstoffe (Chemistry and Technology of Paraffin Hydrocarbons), Akademie-Verlag-Berlin, 1956, pages 395 to 474).

Emulsifiers according to the invention, which have a high content of polysulphonic acids or alkali metal salts thereof, are obtained, for example, when the alkanes are sulphochlorinated to as high a degree as possible and the products are then saponified. Monosulphonic acid contents which are still present can be separated off. Separation can be effected, for example, by extraction with diethyl ether.

According to the invention, the emulsifiers contain more than 50% by weight of an alkali metal salt of a polysulphonic acid of an alkane of medium chain length. These emulsifiers give rise to a particularly high transparency, a low degree of yellowness and favourable antistatic properties in the polyvinyl chloride. In the case of good antistatic values, these properties are particularly outstanding if an emulsifier which consists of only the alkali metal salt of an alkanepolysulphonic acid and contains virtually no monosulphonic acids is employed.

However, the preparation of such emulsifiers is associated with an increased expenditure, so that, in practice, emulsifiers which are easier to prepare and have a certain content of alkanemonosulphonic acid are used, without noticeable losses in the quality of the emulsifier.

Emulsifiers which also contain, in addition to the alkali metal salt of the alkanepolysulphonic acid, less than 50% by weight of an alkali metal alkanemonosulphonic acid are thus preferably employed for the preparation of polymers. Emulsifiers which contain 20 to 40% by weight of an alkali metal salt of a monosulphonic acid and 60 to 80% by weight of an alkali metal salt of a polysulphonic acid are particularly preferred.

The amount of emulsifier according to the invention which is added to the polyvinyl chloride can be varied. In general, 0.5 to 3% by weight, preferably 1 to 2% by weight, relative to the vinyl chloride, is added.

The emulsifiers according to the invention can be used as auxiliaries in the preparation of polymers from appropriate monomers which can undergo free radical polymerization. The following polymers can be prepared, for example: polyethylene, polybutadiene, polychloroprene, polystyrene, polyvinyl chloride, polyvinylidene chloride, polyvinyl acetate, polyvinyl propionate, polyacrylonitrile, polymethacrylonitrile, polyacrylates, such as polymethyl acrylate, polyethyl acrylate, poly-n-butyl acrylate and poly-2-ethylhexyl acrylate, and poly-methacrylates, such as poly-methyl methacrylate, poly-ethyl methacrylate and poly-n-butyl methacrylate. The polymers can be soluble or cross-linked.

Copolymers of the monomer units mentioned can also be prepared in the presence of the emulsifiers according to the invention.

The emulsifiers according to the invention are used, in particular, for the preparation of polyvinyl chloride and polyvinyl chloride copolymers. The emulsifier can be added to the monomeric vinyl chloride before the polymerization, but it can also be added after the polymerization, for example during processing of the polymer in a calender. The transparency, the degree of yellowness and the antistatic properties of the polyvinyl chloride or of the copolymer is thereby improved.

In the case of suspension polyvinyl chloride which can be calendered, the emulsifiers according to the invention can preferably be added before or during calendering of the polyvinyl chloride. In the case of emulsion polyvinyl chloride, the emulsifiers according to the invention are usually added during the polymerization of the vinyl chloride.

Vinyl chloride can be polymerized, for example, in the presence of the emulsifier according to the invention as follows.

Vinyl chloride is mixed with the emulsifier, in an amount according to the invention, in an aqueous medium in the temperature range from 40° to 80° C. The water-soluble per-compounds which are in themselves known, such as, for example, alkali metal persulphates, hydrogen peroxide and tert.-butyl hydroperoxide, can be used as the polymerization initiators. However, it is also possible to employ water-insoluble, monomer-soluble organic peroxides.

The polymerization can also be started by redox initiator systems, such as, for example, potassium persulphate/sodium formaldehyde-sulphoxylate or persulphate/pyrosulphate, if appropriate in the presence of small amounts of complex-bonded heavy metal ions, such as, for example, iron-II ions. Sodium carbonate, sodium bicarbonate and alkali metal phosphate can be employed, for example, as buffers for regulating the polymerization process.

After the polymerization for example, the aqueous phase can be separated off and the polymer can be dried by spray-drying.

The PVC powder prepared according to the invention and obtained, after spray-drying, from aqueous PVC dispersions can be processed to plastisols in mixing devices after adding customary plasticizers such as, for example, dioctyl phthalate, dioctyl adipate, benzyl butyl phthalate, alkyl-sulphonic acid esters of phenol or phosphoric acid esters, such as trioctyl phosphate or diphenyl cresyl phosphate, in the ratio of 60 parts by weight of PVC: 40 parts by weight of plasticiser. After about 30 hours, the viscosity of these plastisols remains virtually constant over long periods of time (4–6 weeks).

However, it is also possible to process the resulting polyvinyl chloride on a calender in the customary manner. Films or hides are thereby obtained.

It is possible to mix the emulsifiers according to the invention with other dispersing agents and emulsifiers. Examples which may be mentioned are: alkylbenzene-sulphonates, alkyl-sulphates, alkylaryl polyglycol ethers and alkyl polyglycol ethers.

It is also possible to replace all or some of the monosulphonic acid constituent by other emulsifiers.

It is surprising that, by using an emulsifier containing more than 50% by weight of an alkali metal salt of an alkanepolysulphonic acid, the transparency and the degree of yellowness of the polyvinyl chloride can be improved substantially, the antistatic properties being favourable.

EXAMPLE 1

(Preparation of the emulsifier)

A mixture of linear alkanes (8 to 20 carbon atoms in the molecule, average number of carbon atoms is 15) is sulphochlorinated in the presence of light with a gas mixture consisting of 1.1 parts by weight of sulphur dioxide and 1.0 part by weight of chlorine, at a temperature of 30° to 40° C., whilst stirring and at the same time cooling. The sulphochlorination is carried out until the density of the reaction mixture is 1.165 g/cm$^3$ at 45° C. The sulphochloride content is then 15.5 to 16.0% by weight.

200 g of the sulphonation mixture are added dropwise to 144 g of 50% strength by weight sodium hydroxide solution, which has been warmed to 50° to 60° C. The reaction mixture is kept at a temperature of 95° to 100° C. by cooling. When the reaction has ended, the reaction mixture is adjusted to a pH value of 9 to 10 by adding concentrated sodium hydroxide solution. The reaction mixture is then cooled to 60° to 70° C.

In this temperature range, sodium chloride precipitates and is filtered off or centrifuged off. The solution, which is virtually free from sodium chloride, is evaporated to dryness in vacuo. 220 g of sodium alkane-sulphonate are thereby obtained. The sodium alkane-sulphonate consists of: 28% by weight of sodium alkane-monosulphonate and 67% by weight of sodium alkane-polysulphonate.

The sodium alkane-sulphonate thus obtained is employed as an emulsifier for the preparation of polymers.

EXAMPLE 2

(Preparation of polyvinyl chloride by a semi-continuous process)

| | |
|---|---|
| Size of autoclave | 40 l |
| Temperature | 48° C. |
| Stirrer | blade stirrer |
| Pressure | 4.5 to 8 atmospheres gauge |
| Batch: | |
| Water | 12,000 g ⎫ |
| Emulsifier according to Example 1 | 20 g ⎬ A |
| Sodium bicarbonate | 40 g ⎪ |
| Potassium peroxodisulphate | 26 g ⎭ |
| Vinyl chloride | 3,000 g } B |
| Water | 3,600 g ⎫ |
| Emulsifier according to Example 1 | 200 g ⎬ C |
| Sodium bicarbonate | 20 g ⎭ |
| Vinyl chloride | 12,600 g } D |

Preparation:

A was initially introduced into the autoclave and the oxygen was removed from the autoclave by flushing with nitrogen.

B was then added and the mixture was heated to 48° C., whilst stirring.

At the start of polymerization, 1 g of the sodium salt of methylenehydroxy-sulphonic acid in 200 ml of water was also added.

C and D were then metered in together in the course of 6 hours.

After removing the residual vinyl chloride, the latex can be discharged.

A coagulate-free latex with a solids content of about 50% by weight results.

After spray-drying, the dispersions which can be prepared with the emulsifier according to the invention give PVC powders with recognizably improved properties, in particular improved transparency, a lower degree of yellowness and good antistatic behaviour. After adding the customary plasticizers, PVC plastisols with improved rheological properties result.

When comparable amounts of other customary emulsifiers, such as, for example, sodium alkane-sulphonates containing 80–90% of monosulphate and with a polysulphonate content of 10–20, are used, dispersions are obtained which, after spray-drying, give powders and, prepared therefrom, PVC pastes with less favourable rheological properties.

EXAMPLE 3

Copolymers can be prepared by the process described under 2.

Thus, for example, up to 50% of vinyl chloride can be replaced by vinyl acetate. It is likewise also possible to employ other monomers, such as, for example, ethylene, propylene and the like, as a rule up to 20% of the amount of vinyl chloride to prepare copolymers of vinyl chloride.

EXAMPLE 4

1.5 g of the emulsifier according to Example 1 are admixed to 50 g of a polyvinyl chloride, prepared by the suspension process, before calendering. In this case also, films or hides with an excellent degree of yellowness, a very good transparency and good antistatic effects are obtained.

EXAMPLE 5

1.5 g of the emulsifier according to Example 1 are admixed to 50 g of polyvinyl chloride, prepared by the emulsion process, before calendering. In this case also, films or hides with good antistatic properties and a very good transparency are obtained.

EXAMPLE 6

(Determination of the transmission and the degree of yellowness of the polyvinyl chloride and various amounts of mono- and poly-sulphonic acids)

Suspension polyvinyl chloride to which the emulsifier had been added before calendering was used for the measurements. In each case 3% by weight of emulsifiers with various mono-/poly-sulphonate contents were added to the individual samples.

The results obtained can be found in the following table.

The transmission was measured in a commercially available spectrophotometer in the wave range from 380 to 700 nm.

The degree of yellowness was determined in accordance with the method of ASTM 313-667, likewise using the abovementioned spectrophotometer.

TABLE I

| Content of emulsifier: | | | |
|---|---|---|---|
| Monosulphonic acid [%] | Polysulphonic acid [%] | Transmission [%] | Degree of yellowness |
| 90 | 10 | 31 | 54 |
| 85 | 15 | 35 | 49 |
| 50 | 50 | 38 | 24 |
| 30 | 70 | 43 | 15 |
| 20 | 80 | 58 | 14.5 |
| without emulsifier | | 79 | 5 |

EXAMPLE 7

It is shown that the emulsifier according to the invention, prepared according to Example 1, can be used for the preparation of various types of polymer dispersions.

The emulsion polymerisations are carried out in a 6 liter stirred autoclave which can be subjected to a pressure of up to 20 bars.

A number of polymerisation examples are summarised in Table II.

Speed of the blade stirrer in all experiments: 125 revolutions per minute. Water and the emulsifier solution, together with the initiator ($K_2S_2O_8$) dissolved therein and if appropriate dodecylmercaptan (to regulate the molecular weight), are initially introduced into the autoclave and the atmospheric oxygen is removed by evacuating the free space in the autoclave and compensating with new nitrogen several times.

After adding the monomers, the autoclave is heated up to the desired polymerisation temperature, whilst stirring, and this temperature is kept constant throughout the entire polymerisation period.

After cooling to about 20° C., the autoclave is let down, if appropriate, to atmospheric pressure and the latex is drained off and filtered through a 50$\mu$ Perlon fabric with a square mesh. The coagulate which remains on the filter was washed with water and dried to constant weight. The solids content of the filtered latex was determined.

TABLE II

| For the explanations, compare the text of Example 7 | | | | | | |
|---|---|---|---|---|---|---|
| Experiment | | 7.1 | 7.2 | 7.3 | 7.4 | 7.5 |
| Deionised water | (g) | 1,700 | 1,700 | 1,700 | 1,700 | 1,700 |
| 5% strength aqueous solution of the emulsifier according to Example 1 | (g) | 1,300 | 1,300 | 1,300 | 1,300 | 1,300 |
| Dodecylmercaptan | (g) | — | 8.0 | — | — | — |
| Potassium peroxodisulphate | (g) | 4.4 | 4.4 | 4.4 | 4.4 | 4.4 |
| Vinyl chloride | (g) | 1,580 | — | — | — | — |
| Butadiene | (g) | — | 1,120 | — | — | — |
| Styrene | (g) | — | 460 | 1,580 | — | 790 |
| n-Butyl acrylate | (g) | — | — | — | 1,000 | 790 |
| Acrylonitrile | (g) | — | — | — | 580 | — |
| Polymerisation temperature | (°C.) | 50 | 50 | 70 | 60 | 70 |
| Polymerisation time | (hours) | 12 | 20 | 7 | 7 | 7 |
| Solids content of the latex | (% by weight) | 33.5 | 34.2 | 34.8 | 35.0 | 34.9 |
| Coagulate | (g) | 0.5 | 5 | 1.5 | 0.9 | 0.7 |

What is claimed is:

1. An emulsifier for the preparation of a polymeric emulsion which comprises at least 50 percent by weight of an alkali metal salt of a polysulphonic acid of an alkane of 8 to 20 carbon atoms and an alkali metal salt of a monosulphonic acid of an alkane of 8 to 20 carbon atoms.

2. An emulsifier according to claim 1, comprising 20 to 40 percent by weight of an alkali metal salt of a monosulphonic acid of an alkane of 8 to 20 carbon atoms and 60 to 80 percent by weight of an alkali metal salt of a polysulphonic acid of an alkane of 8 to 20 carbon atoms.

3. In a process for preparing a polyvinyl chloride homopolymer or copolymer wherein vinylchloride alone or in admixture with a comonomer is polymerized in an aqueous solution to form an aqueous emulsion of said homopolymer or copolymer, the improvement wherein said emulsifier comprises an alkali metal salt of a polysulphonic acid of an alkane of chain length of 8 to 20 carbon atoms and an alkali metal salt of a monosulphonic acid of an alkane of 8 to 20 carbon atoms.

4. A process according to claim 3, wherein said alkali metal salt of polysulphonic acid of alkane of 8 to 20 carbon atoms is present in an amount of more than 50 percent by weight based upon the total weight of emulsifiers present therein.

5. A process according to claim 4, wherein the total quantity of emulsifier employed is 0.5 to 3 percent by weight.

6. A process according to claim 4, wherein said emulsifier is added before polymerization.

7. In a process wherein a polyvinyl chloride homo or copolymer is calendered to form a polyvinyl chloride containing article the improvement for improving the transparency and antistatic characteristics of the resultant article which comprises adding to the polyvinyl chloride polymer to be calendered an emulsifier comprising an alkali metal salt of a polysulphonic acid of an alkane of chain length of 8 to 20 carbon atoms.

8. A process according to claim 7, wherein said alkali metal salt of polysulphonic acid of alkane is present in an admixture of more than 50 percent by weight of the total emulsifier content of the material to be calendered.

9. A process according to claim 8, wherein 0.5 to 3 percent by weight of emulsifier is added to the polyvinyl chloride polymer to be calendered.

* * * * *